United States Patent
Martineau et al.

(10) Patent No.: US 11,525,360 B2
(45) Date of Patent: Dec. 13, 2022

(54) VENTILATED HIGH PRESSURE BLADE OF A HELICOPTER TURBINE COMPRISING AN UPSTREAM DUCT AND A CENTRAL COOLING CHAMBER

(71) Applicant: SAFRAN HELICOPTER ENGINES, Bordes (FR)

(72) Inventors: Gontran Martineau, Moissy-Cramayel (FR); Frédéric Philippe Jean-Jacques Pardo, Moissy-Cramayel (FR); Kévin Pilette, Moissy-Cramayel (FR); Jean-Luc Pierre Sahores, Moissy-Cramayel (FR); Julien Carbon, Moissy-Cramayel (FR)

(73) Assignee: SAFRAN HELICOPTER ENGINES, Bordes (FR)

( * ) Notice: Subject to any disclaimer, the term of this patent is extended or adjusted under 35 U.S.C. 154(b) by 35 days.

(21) Appl. No.: 16/483,828

(22) PCT Filed: Feb. 5, 2018

(86) PCT No.: PCT/FR2018/050273
§ 371 (c)(1),
(2) Date: Aug. 6, 2019

(87) PCT Pub. No.: WO2018/146403
PCT Pub. Date: Aug. 16, 2018

(65) Prior Publication Data
US 2019/0390554 A1    Dec. 26, 2019

(30) Foreign Application Priority Data
Feb. 7, 2017   (FR) ..................................... 17 51006

(51) Int. Cl.
*F01D 5/18* (2006.01)
*B64C 27/18* (2006.01)

(52) U.S. Cl.
CPC .............. *F01D 5/186* (2013.01); *B64C 27/18* (2013.01); *F01D 5/187* (2013.01);
(Continued)

(58) Field of Classification Search
CPC .......... F01D 5/186; F01D 5/187; F01D 5/188; F05D 2240/301; F05D 2260/202
See application file for complete search history.

(56) References Cited

U.S. PATENT DOCUMENTS 4,775,296 A * 10/1988  Schwarzmann ........ F01D 5/187
                                                    415/115
5,503,529 A *  4/1996  Anselmi ................. F01D 5/186
                                                    416/97 R
(Continued)

FOREIGN PATENT DOCUMENTS

| EP | 0034961 B1 | 10/1984 |
| EP | 1503038 A1 | 2/2005 |
| EP | 2037081 B1 | 12/2016 |

OTHER PUBLICATIONS

Machine translation of EP 0034961 A1 (Feb. 5, 1981) (Year: 1981).*

(Continued)

*Primary Examiner* — Christopher R Legendre
(74) *Attorney, Agent, or Firm* — Pearne & Gordon LLP

(57) ABSTRACT

A blade of a high-pressure turbine of a turboshaft engine, the blade including an airfoil extending in a spanwise direction, terminating in an apex and having a suction wall and a pressure wall joined by a leading edge and joined by a trailing edge. The blade further includes an internal cooling circuit having only an upstream duct and a central chamber for cooling the blade by circulating air. The upstream duct and the central chamber are separately supplied with air. The upstream duct being dedicated to the cooling of the leading edge and the suction wall, and the central chamber being (Continued)

dedicated to the cooling of the pressure wall and the trailing edge and being provided with bridge elements each connecting the pressure wall and the suction wall.

12 Claims, 3 Drawing Sheets

(52) U.S. Cl.
CPC .. *F05D 2220/323* (2013.01); *F05D 2240/301* (2013.01); *F05D 2260/202* (2013.01)

(56) References Cited

U.S. PATENT DOCUMENTS

| | | | | |
|---|---|---|---|---|
| 6,033,181 A * | 3/2000 | Endres | ............ | F01D 5/187 416/96 A |
| 6,602,052 B2 * | 8/2003 | Liang | ............ | F01D 5/18 416/224 |
| 7,413,406 B2 * | 8/2008 | Pietraszkiewicz | ...... | F01D 5/187 416/96 R |
| 7,722,326 B2 * | 5/2010 | Beeck | ............ | F01D 5/187 416/97 R |
| 8,545,180 B1 * | 10/2013 | Liang | ............ | F01D 5/186 416/97 R |
| 9,464,528 B2 * | 10/2016 | Zhang | ............ | F01D 5/187 |
| 2009/0297361 A1 | 12/2009 | Dahmer | | |
| 2012/0070308 A1 * | 3/2012 | Naik | ............ | F01D 5/20 416/97 R |
| 2013/0302179 A1 * | 11/2013 | Bergholz, Jr. | ............ | F01D 5/189 416/97 R |
| 2015/0184518 A1 * | 7/2015 | Lee | ............ | B22C 7/02 416/97 R |
| 2015/0192072 A1 * | 7/2015 | Hagan | ............ | F23R 3/26 60/783 |
| 2016/0024938 A1 * | 1/2016 | Slavens | ............ | F01D 5/187 416/1 |
| 2016/0115864 A1 * | 4/2016 | Campbell | ............ | F02C 7/14 29/888.012 |
| 2016/0326883 A1 * | 11/2016 | Thornton | ............ | F01D 5/186 |
| 2019/0390554 A1 * | 12/2019 | Martineau | ............ | B64C 27/18 |

OTHER PUBLICATIONS

Search Report issued in French Patent Application No. 17 51006 dated Oct. 30, 2017.
International Search Report issued in Application No. PCT/FR2018/050273 dated Jul. 18, 2018.
Written Opinion issued in Application No. PCT/FR2018/050273 dated Jul. 18, 2018.

* cited by examiner

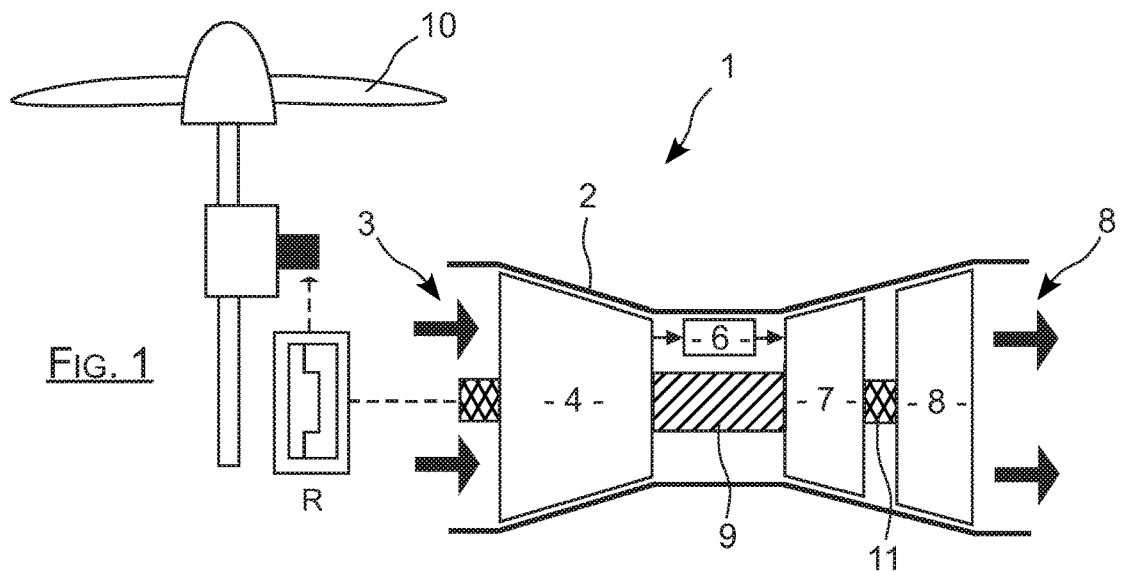
FIG. 1
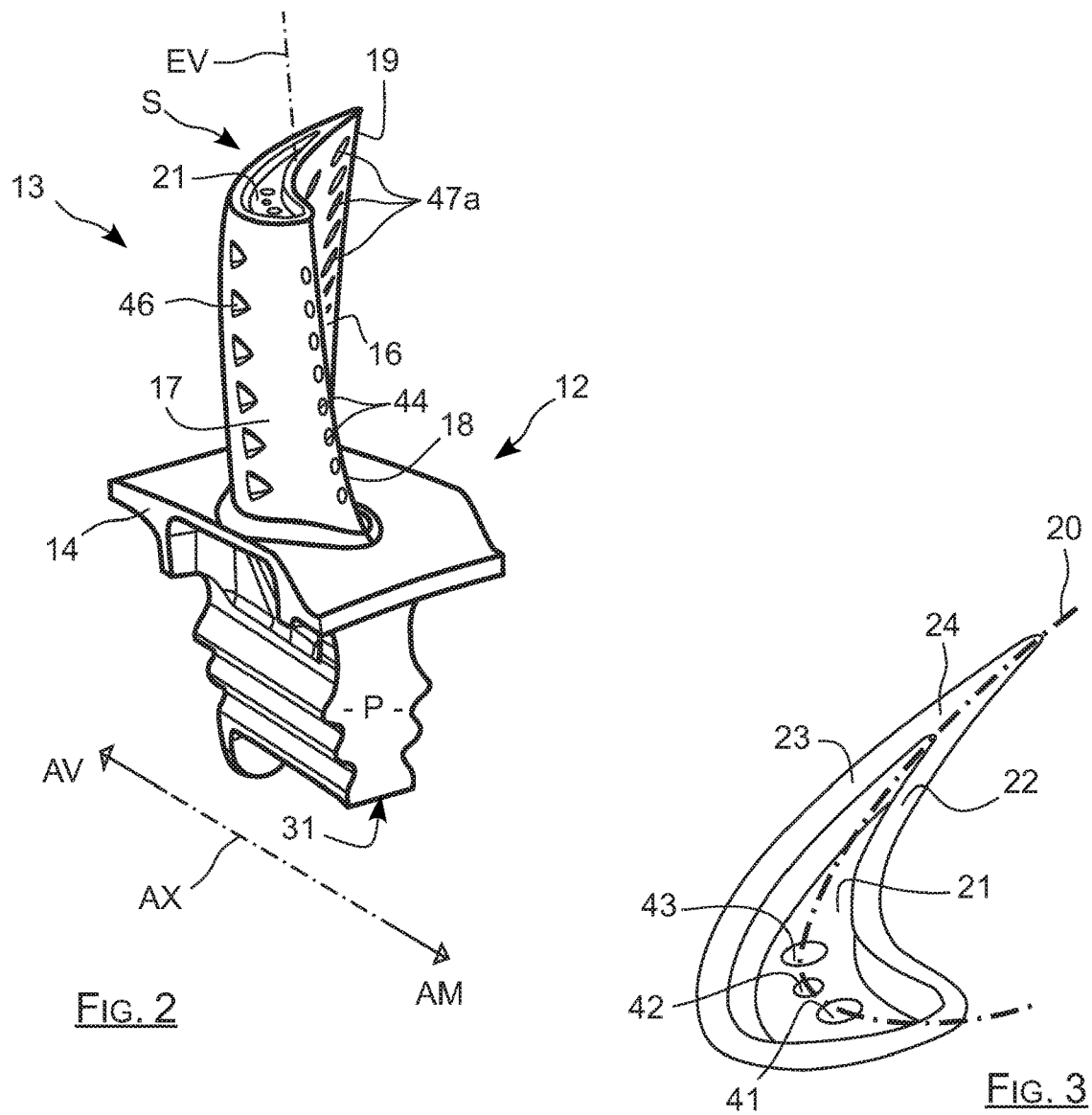
FIG. 2
FIG. 3

VENTILATED HIGH PRESSURE BLADE OF A HELICOPTER TURBINE COMPRISING AN UPSTREAM DUCT AND A CENTRAL COOLING CHAMBER

This is the National Stage application of PCT international application PCT/FR2018/050273, filed on Feb. 5, 2018 entitled "VENTILATED BLADE OF A HIGH PRESSURE TURBINE", which claims the priority of French Patent Application No. 17 51006 filed Feb. 7, 2017, both of which are incorporated herein by reference in their entirety.

TECHNICAL FIELD

This invention relates to a high pressure blade of a helicopter turboshaft engine.

STATE OF PRIOR ART

The architecture of a helicopter turboshaft engine is available in different configurations such as the configuration shown on FIG. 1 with a so-called free turbine that drives helicopter rotors through a reduction gear.

In such an engine, marked with the reference 1, that is delimited by an external case 2, external air is drawn into an intake sleeve 3, and is compressed as it passes through a compressor 4 before arriving in a combustion chamber 6. At the exit of the combustion chamber 6, air expands as it passes through a first turbine 7 called the high pressure turbine, then a second turbine 8 called the low pressure turbine, before being discharged outside the engine through an exhaust duct 8.

The kinetic energy of the hot gases at the exit of the combustion chamber 6 is then transformed into mechanical energy as it passes through and drives the turbine 7 and 8.

Each turbine 7 and 8 comprises a sequence of stages each comprising a series of blades uniformly spaced from each other around a corresponding rotation shaft. The high pressure turbine 7 is connected to a shaft 9 of the engine 1 and on which the compressor 4 is mounted, rotation of this high pressure turbine 7 driving movement of the compressor 4. The low pressure or free turbine 8 is connected to a shaft 11 passing inside the shaft 9 to drive the rotors of the helicopter 10 through a reduction gear assembly R on FIG. 1.

In general, the turbine blades that are subject to most severe conditions are the high pressure turbine blades regardless of the configuration of the turboshaft engine, namely at the stages closest to the combustion chamber.

In practice, increasing performance of turbo-engines requires to increase the resistance of the high pressure turbine blades, particularly concerning their temperature resistance, since temperatures tend continuously to raise at the exit of the combustion chamber.

This situation makes it necessary to reconsider cooling of the blades so that they can resist these new operating conditions, the temperature of the combustion gases being much higher than the melting temperature of the materials from which these blades are made.

This cooling is achieved by circulating cool air drawn off from the turboshaft engine upstream from combustion, inside the blades. This air is inlet at the root of the blade and is routed along an internal circuit in the blade to cool it, and it is evacuated outside the blade through holes passing through the walls of this blade and distributed on these walls. These holes are used to evacuate cooling air, and to create an air film on the external surface of the blade that is colder than combustion gases that contribute to limiting the temperature of the blade.

The purpose of the invention is to provide a blade structure allowing to increase the cooling efficiency while having a reduced fabrication cost.

PRESENTATION OF THE INVENTION

To achieve this, the purpose of the invention is a high pressure turbine blade of a turbine engine, such a turboshaft engine comprising:
- an airfoil extending in a spanwise direction, terminating in an apex and comprising a pressure wall and a suction wall joined at upstream side by a leading edge and joined at downstream side by a trailing edge,
- an internal cooling circuit having only an upstream duct and a central chamber for cooling this blade by circulating air;
- wherein the upstream duct and the central chamber are supplied with air separately;
- the upstream duct being dedicated to the cooling of the leading edge and the upper surface;
- and the central chamber being dedicated to the cooling of the pressure wall and the trailing edge and is provided with bridge elements connecting the pressure wall and the suction wall.

With this solution, the blade has a simple and efficient internal cooling circuit, such that the scrap ratio during the foundry fabrication step goes down, which reduces the fabrication cost. The ventilation efficiency of the blade, that is provided with independent upstream duct and central chamber that are each specifically designed for cooling different and complementary parts of this blade, is optimised to suit needs.

This sharing of roles between the duct and the chamber makes it possible to change cooling of the suction wall and/or the leading edge, without changing cooling of the pressure wall and/or the trailing edge. Since the duct and the chamber are separated by a single separation wall, simply reorganising this wall can modify the entire blade cooling system, for example by offsetting this separation wall to change the flow.

The invention also relates to a blade thus defined, comprising a root prolonged by a platform supporting the blade, in which the upstream duct and the central chamber are supplied by two inlets with the same sections located on the lower face of the root, wherein the upstream duct narrows from its inlet to the platform, and wherein the central chamber widens from its inlet to the platform.

The invention also relates to a blade thus defined, comprising a series of holes for cooling its trailing edge, each hole having a circular section and connecting the central chamber with the exterior by passing through the pressure wall, extending from an inlet on the internal face of the pressure wall to an outlet on the external face of the pressure wall.

The invention also relates to a blade thus defined, wherein each cooling hole for cooling the trailing edge is inclined such that its outlet is offset from its inlet towards the apex and towards the trailing edge.

The invention also relates to a blade thus defined, in which each cooling hole for cooling the trailing edge is inclined by an angle, the closer to the apex (S) the cooling hole (47a) is, the larger said angle is.

The invention also relates to a blade thus defined, in which the leading edge comprises a series of holes each of which connects the upstream duct with the exterior, each hole for cooling the leading edge being inclined and comprising an outlet located on the external face of the leading edge, an inlet located on the internal face of the leading edge (18), the outlet being closer to the apex (S) than the inlet.

The invention also relates to a blade thus defined, in which each cooling hole for cooling the leading edge is inclined by an angle, the closer to the apex (S) the cooling hole (44) is, the larger said angle is.

The invention also relates to a blade thus defined, in which the suction wall comprises a series of cooling holes for cooling the suction wall each having a section that increases from its inlet located on the inner face of the suction wall to its outlet located on the outer face of this suction wall.

The invention also relates to a blade thus defined, in which each cooling hole for cooling the suction wall has an average section, the further to the apex (S) the cooling hole (44) is, the larger said average section is.

The invention also relates to a turbine comprising a blade thus defined.

The invention also relates to a helicopter comprising a turbine thus defined.

BRIEF DESCRIPTION OF THE DRAWINGS

FIG. 1 already described is a longitudinal sectional principle diagram of a single spool turboshaft engine having a free turbine;

FIG. 2 is a perspective view of a high pressure turbine blade according to the invention;

FIG. 3 is a detailed view of the apex of the blade according to the invention;

DETAILED PRESENTATION OF PARTICULAR EMBODIMENTS

Figure 4:
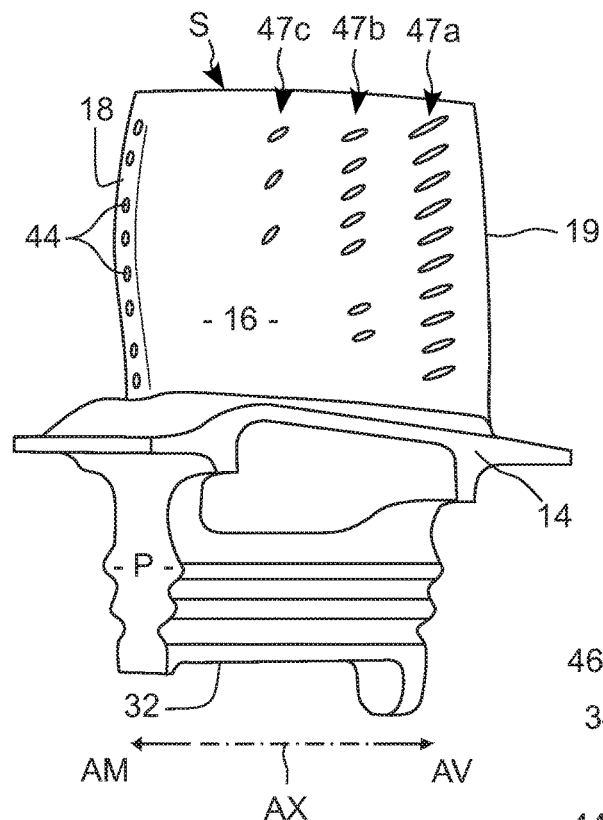
FIG. 4 is a lateral view showing the pressure wall on the outer face of the blade according to the invention.

The blade according to the invention, identified by mark 12 on FIG. 2, comprises a root P through which it is fixed to a rotating body not shown that is called a turbine disk, of which a rotation axis AX corresponds to the direction of movement of the engine fitted with such a disk, or corresponds to the longitudinal direction of the root P. This blade also comprises an airfoil 13 supported by the root P and a platform P that connects the root P to the airfoil 13.

The root P has a firtree-shaped contour in a cross-sectional view normal to the AX axis, that enables the blade 12 to engage into a corresponding notch in the turbine disk.

Designed according to the direction of arrival of combustion gases, the airfoil 13 extends along a curved profile from the root P to an apex S by twisting around a so-called spanwisewise axis EV that is perpendicular to the AX axis.

This airfoil 13 comprises a pressure wall 16 and a suction wall 17 that are spaced apart along a median line of the blade profile, also called skeleton 20 illustrated on FIG. 3. This pressure wall 16 and suction wall 17 are joined together at a first end of the skeleton 20 located in a upstream region AM of the airfoil by a leading edge 18 and at a second end 20 located in a downstream region AV of the airfoil by a trailing edge 19.

The pressure wall 16 and the suction wall 17 and the leading edge 18 and the trailing edge 19 have curved shapes that extend approximately parallel to the spanwise direction EV. Additionally, a closing wall 21 connects the pressure wall 16 to the suction wall 17 perpendicular to the EV axis in the region of the apex S. The pressure wall 16 and the suction wall 17 extend beyond the closing wall 21 from which they project and form an upstream edge 22 and a downstream edge 23 respectively, as seen on FIG. 3. These two edges 22 and 23 jointly form a peripheral edge 24 that delimits a bath, the bottom of which is the closing wall 21.

Figure 5:
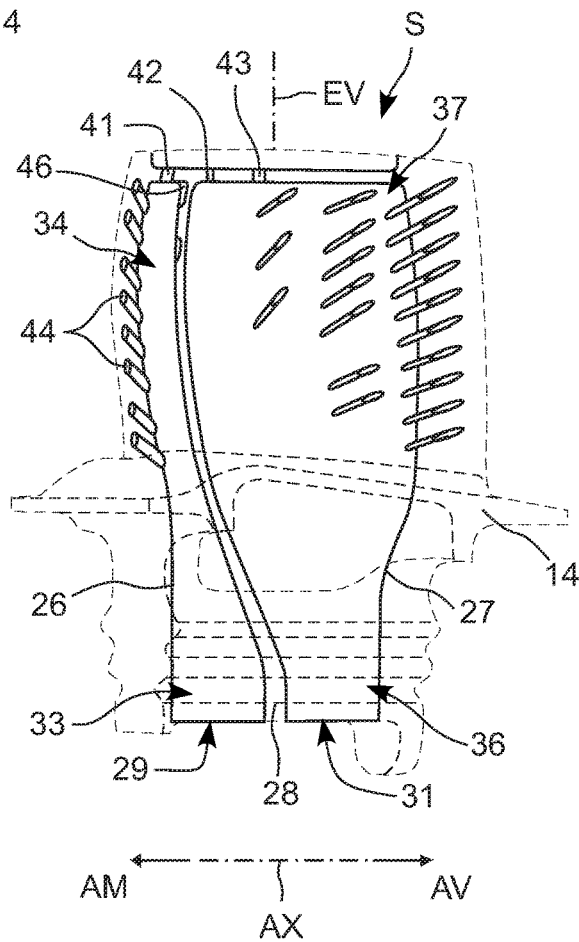
FIG. 5 is a lateral view showing the internal cooling circuit through the pressure wall of the blade according to the invention.
Figure 6:
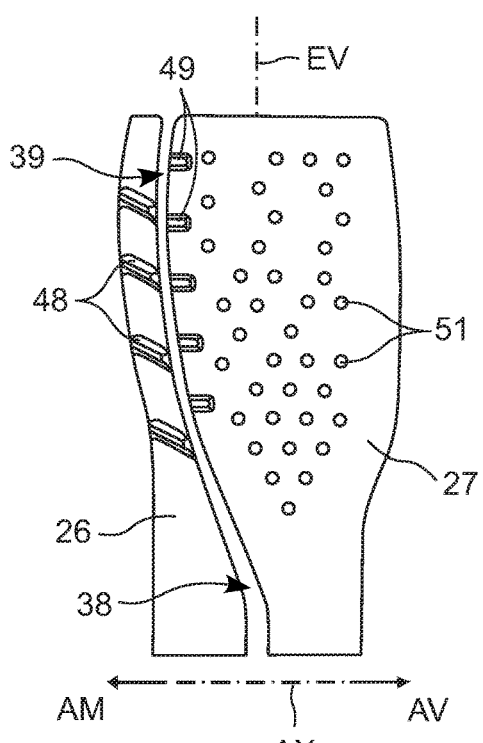
FIG. 6 is a detailed view of the upstream duct and the central chamber of the internal cooling circuit through the pressure wall of the blade according to the invention.
Figure 7:
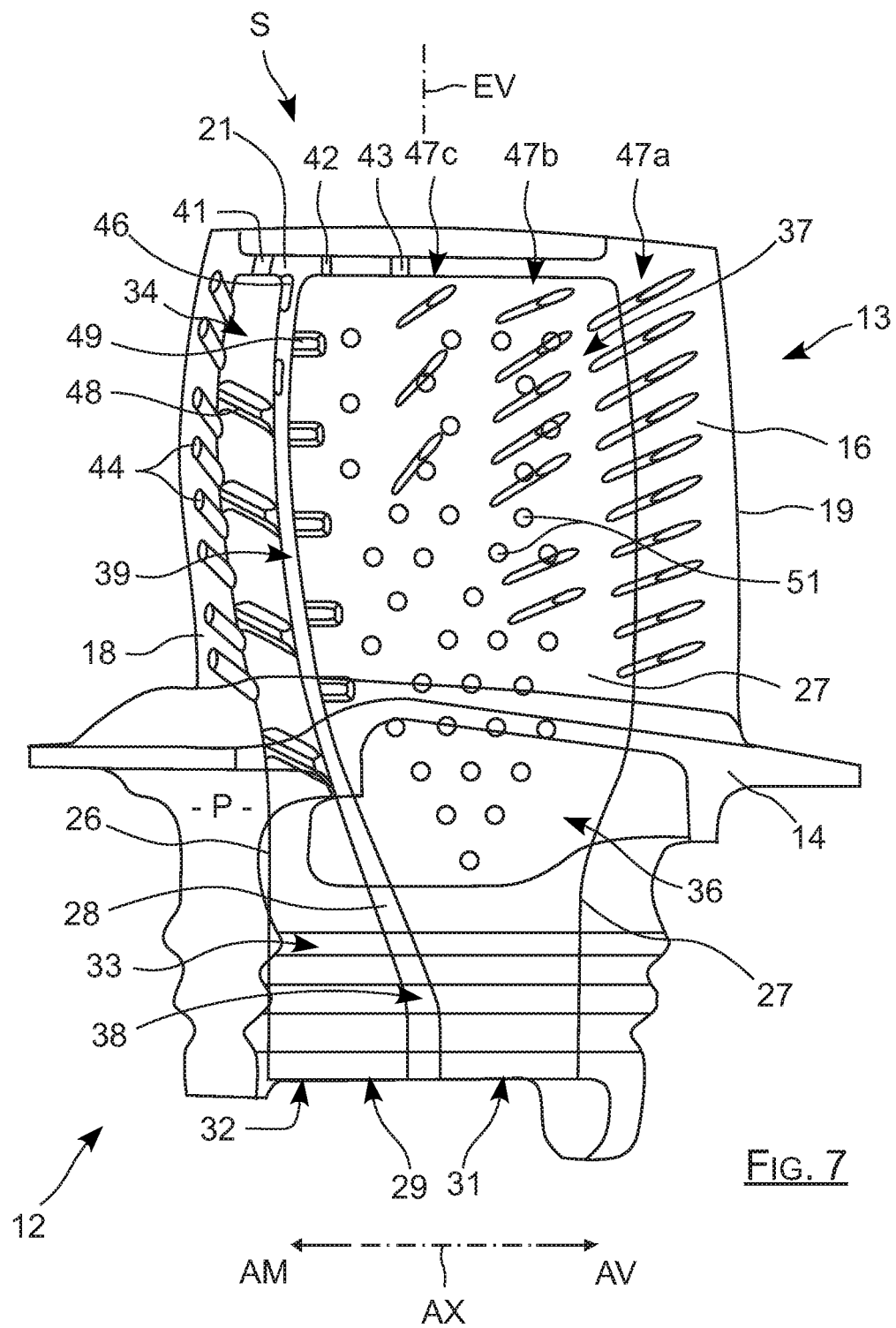
FIG. 7 is a lateral view of the blade according to the invention in its entirety.

This blade 12 is a single-piece component fabricated by casting a metal alloy, using a set of core elements solidarised to each other to delimit an internal cooling circuit 25 including an upstream duct 26 and a central chamber 27, visible on FIGS. 5, 6 and 7, that are isolated from each other by a separation wall 28. This set of core elements is commonly removed after casting and cooling, by etching processes.

Under operating conditions, the blade 12 is cooled by circulating fresh air inside this internal cooling circuit 25. This fresh air is inlet through two openings with the same sections comprising more particularly an inlet 29 of the upstream duct 26 and an inlet 31 of the central chamber 27, these inlets 29 and 31 being formed through a lower face 32 of the root P, and discharged through holes passing through the walls that delimit the airfoil 13.

The upstream duct 26 is tubular in shape and extends from the lower face 32 to collect air at its inlet 29, to the closing wall 21. It is specifically for cooling the leading edge and the suction wall 17.

This duct 26 comprises a lower portion 33 that extends from the lower face 32 as far as the platform 14, and an upper portion 34 that extends from the platform 14 as far as the closing wall 21.

The lower portion 33 is a volume hollowed out from the root P that is delimited by an upstream wall of the root P extending in a plane normal to the AX axis, by two lateral walls of the root P, and by the separation wall 28. This lower portion 33 has a section gaving an approximately constant area from the lower face 32 along about one-sixth of the height of the root P, and then reduces to the platform 14.

The upper portion 34 is a hollowed out volume in the airfoil 13 that, from the platform 14 as far as the closing wall 21, maintains a constant distance from the external face of the leading edge 18, of which it follows the curve. This upper portion 34 has a section with an approximately constant area.

The shape of the central chamber 27 dedicated to cooling the pressure wall 16 and the trailing edge 19, when viewed in a lateral view along an axis perpendicular to both the AX axis and the EV axis, has a contour similar to the contour of a "chopper knife". This central chamber 27 extends globally along a direction parallel to the EV direction from the lower face 32, to collect air at its inlet 31, as far as the closing wall 21.

In the same way as the duct 26, this chamber 27 comprises a lower portion 36 that extends from the lower face 32 as far as the platform 14, and an upper portion 37 that extends from the platform 14 as far as the closing wall 21.

The lower portion 36 is a volume hollowed out from the root P that is delimited by a downstream wall of the root P, extending in a plane normal to the AX axis, by two lateral walls of this root P, and by the separation wall 28.

The lower portion 36 has a section whose area increases from the lower face 32 up to the level of half of the root P, and then becomes even wider until reaching the platform 14 following the downstream wall of the root P that includes a ramp oriented towards downstream from the blade 12 by about 20° relative to the EV axis.

The upper portion 37 is a hollowed out volume in the airfoil 13 that is delimited by an upper portion 39 of the separation wall 28, and by the pressure wall 16 and the suction wall 17 that join together at the trailing edge 19.

As can be seen particularly on FIGS. 5 to 7, in a lateral view, in other words a view perpendicular to the AX and EV axes, the shape of the upper portion 37 of the central chamber has a convex contour, in other words without a meander to extend continuously in a single piece from its upstream part as far as its downstream part.

The separation wall 28 extends from a central region of the lower face 32 as far as an upstream region of the closing wall 21, the closing wall 21 possibly being split into an upstream half and a downstream half.

In general, the skeleton 20 can be split into an upstream half and a downstream half separated from each other by a median line of the skeleton located at mid-distance between the leading edge 18 and the trailing edge 19. The upstream and downstream halves of the closing wall 21 are thus parts of this closing wall located upstream and downstream from this median line.

As can be seen on FIG. 5, the separation wall 28 joins the closing wall 21 in a region that is closer to the leading edge 18 than it is to the median line of the skeleton 20. In other words, the separation wall 28 joins the closing wall 21 at the upstream quarter of this closing wall 21.

As can be seen on FIGS. 5 and 6, the central chamber 27 thus has a very much larger volume than the upstream chamber 26, considering the proximity of the separation wall 28 from the leading edge 18.

Specifically, the upstream duct 26 narrows from its inlet 29 to the platform 14, while the central chamber widens from its inlet 31 to the platform 14. For any section of the airfoil 13 perpendicular to the EV axis, the section of the upstream duct 26 is less than or equal to one quarter of the sectional area of the central chamber 27.

The separation wall 28 comprises a lower portion 38 extending in the root P, prolonged by an upper portion 39 extending in the airfoil 13.

The lower portion 38 extends from the middle of the lower face 32 as far as the platform 14 along the EV direction along a length equal to about one-sixth of the height of the root P. For any section through the root P perpendicular to the EV axis from the lower face 32 to one-sixth of the height of the root P, the area of the section of the inlet 29 of the upstream duct 26 is equal to the area of the section of the inlet 31 of the central chamber 27.

Beyond one-sixth of the height of the root P, this lower portion 38 extends as far as the platform 14 along an oblique direction oriented towards the apex S and towards the leading edge 18, forming a ramp towards the upstream part of the blade 12.

The upper portion 39 extends into the airfoil 13 from the platform 14 to a far upstream part of the closing wall 21. In a lateral view along an axis perpendicular to the AX and EV axes, the upper portion 39 is curved, being at a constant distance from the leading edge 18.

The closing wall 21 comprises three dust removal holes 41, 42 and 43, that can be seen on FIGS. 3 and 5, that are distributed along the upstream half of the skeleton 20 and extend parallel to the EV axis.

The first hole 41 is the hole closest to the leading edge 18 and connects the upstream duct 26 to the exterior at the apex S. The third hole 43 is the closest to the median line of the skeleton 20 and connects the central chamber 27 with the exterior at the apex S. The first and the third holes 41 and 43 have equivalent current sections.

The second hole 42, that extends at equal distance from the first hole 41 and the third hole 43, connects the central chamber 27 with the exterior at the apex S, its diameter is less than the diameters of the first and third holes 41 and 43.

In practice, the core used to fabricate this blade 12 comprises a first core element fixed to a second core element, that delimit the upstream duct 26 and the central chamber 27 respectively. These two core elements are each connected to an additional core element delimiting the bath, via alumina rods passing through the closing wall 21.

After a first chemical etching to remove the core elements, the connecting rods are removed with a second chemical etching to delimit the holes 41, 42 and 43.

During operation, air taken into the inlet sleeve 3 of a turboshaft engine contains various dust and particles that can be drawn in through the openings 29 and 31 of the cooling circuit of blade 12. The holes 41, 42 and 43 can be used to evacuate this dust and these particles.

This blade 12 comprises a series of eight holes 44 for cooling its leading edge 18, each of which connecting the upper portion 34 of the upstream duct 26 with the exterior. In a side view along an axis perpendicular to the AX axis and to the EV axis, each hole 44 is inclined from the EV axis such that it comprises an outlet located on the external face of this leading edge 18, that is closer to the apex S and the upstream part of the blade 12 than its inlet that is located on the internal face of the leading edge 18.

Each hole 44 is inclined related to the EV axis by an angle that increases with increasing distance from the apex S. The angle formed between each hole 44 and the portion of wall of the leading edge 18 through which it passes is the same along the curve of the duct 26 that is approximately the same as the leading edge 18.

Specifically, the hole 44 closest to the platform 14 is inclined related to the EV axis by the largest angle, and the hole 44 closest to the apex S is inclined from the EV axis by the smallest angle.

This blade 12 also comprises a series of six holes 46 cooling its suction wall 17, uniformly spaced along the EV axis to transfer fresh air from the upper portion 34 of the conduit 26 towards the external face of the suction wall 17. Each hole 46 has a triangular section with rounded vertices, the area of which increases from its inlet on the internal face of the suction wall 17 as far as its outlet located on the external face of this suction wall 17. Each of the holes 46 is thus in the form a truncated pyramid with an irregular triangular base, i.e. formed by three lateral faces having unequal areas.

Each hole 46 comprises a lateral face with larger surface area that forms a ramp such that the air flow follows the suction wall 17, this lateral face with larger surface area intersecting the external face of the suction wall 17 by forming a segment approximately parallel to the EV axis.

The section of each hole 46 increases with increasing distance from the apex S: the volume of the hole closest to the platform 14 is the largest, and the volume of the hole closest to the apex S is the smallest.

Each hole 46 has an average section, in other words a volume, that increases with increasing distance from the apex S.

This blade 12 also comprises a first, a second and a third series of cooling holes 47a, 47b and 47c for cooling the pressure wall 16 and the trailing edge 19, each of which connecting the upper portion 37 of the central chamber 27 to the exterior, as can be seen on FIG. 5.

The holes 47a in the first series are distributed along a first line parallel to the EV axis, there are ten of them and they are the closest to the trailing edge 19 that they cool.

Similarly, the holes 47b of the second series are distributed along a second line parallel to the EV axis, and there are seven of them. Finally, there are three holes 47c in the third series, and they are distributed along a third line parallel to the EV axis and are the furthest from the trailing edge 19 to cool the pressure wall 16.

The first line formed by the series of holes 47a and the third line formed by the third series of holes 47c are each at an equal distance from the second line formed by the second series of holes.

In general, the holes 47a, 47b and 47c cool the outer face of the pressure wall 16 where they form a cooling air film that efficiently protects the pressure wall 16 up to and including the trailing edge 19.

Each hole 47a, 47b and 47c extends from its inlet on the internal face of the pressure wall 16 to its outlet on the external face of the pressure wall 16 and has a circular typical section.

As can be seen particularly on FIG. 5, the holes 47a, 47b and 47c are steeply inclined relative to the pressure wall 16 through which they pass. More particularly, each hole is oriented such that its outlet is offset both towards the apex S and towards the trailing edge 19 from its inlet. As can be seen on FIG. 4, each of these holes 47a, 47b and 47c intersects the external face of the pressure wall 16 by forming an ellipse having an orientation inclined relative to the AX axis.

Concerning the orientation towards the trailing edge 19, the inclination of each hole 47a, 47b and 47c relative to the AX axis decreases with reducing distance between the series to which it belongs and the trailing edge 19, in a top view along the EV axis, i.e. facing the apex S. Specifically, the holes 47a have the smallest inclination relative to the AX axis, resulting in long ellipses, and the holes 47c have the largest inclination relative to the AX axis, resulting in short ellipses.

Concerning the orientation towards the apex S, the inclination of each of the holes 47a towards the apex S increases with decreasing distance from this apex S.

In practice the centrifugal force due to rotation of the turbine disk fitted with such a blade 12 tends to direct cooling air towards the apex S. Consequently, as the distance of a hole 47a from the apex reduces and as the flow of cooling air that passes through it increases, the direction of the air is changed by an amount that decreases with decreasing distance between the hole into which it enters and the apex.

The orientation of the holes 47a allow diffusion of fresh air from the chamber 27 in an optimised manner by covering the portions of the pressure wall 16 on which temperature are most critical, particularly the junction zone between the trailing edge 19 and the apex 20 at which cooling is increased.

The upper portion 34 of the upstream duct 26 comprises four disturbers 48 visible on FIG. 6, each of which is formed by a groove in the core element delimiting the upstream duct 26, this groove delimiting a rib protruding from the pressure wall 16 into the duct.

These disturbers 48 are at a regular spacing of two holes 44 in the trailing edge to disturb the fluid flow inside the upstream duct 26 so as to improve the heat transfer efficiency.

In a lateral view along an axis perpendicular to the AX axis and the EV axis, each disturber 48 is inclined from the AX axis, having its part facing the leading edge 18 that is closer to the apex than its part facing the separation wall 28.

The upper portion 37 of the central chamber 27 comprises five disturbers 49 that are uniformly spaced from each other and are located in the upstream part of the central chamber. Each of these disturbers 49 is formed from a groove in the core element of the central chamber 27 to form a rib projecting from the pressure wall 16 into the central chamber 27.

In a lateral view along an axis perpendicular to the AX and EV axes, these disturbers 49 extend parallel to the AX axis along the far upstream fraction of the internal face of the pressure wall 16.

Solid cylinders 51, called bridge elements, pass through the central chamber 27 and extend perpendicular to the AX axis and to the EV axis from the internal face of the pressure wall 16 as far as the internal face of the suction wall 17. Each bridge element 51, forms a heat transfer bridge between the pressure wall, that is in direct contact with hot gases, and the suction wall, forms a flow disturber that increases turbulence to increase the heat exchange efficiency, and forms also also a stiffener that increases cohesion between the pressure and suction walls.

Due to these bridge elements, the central chamber 27 may have a large volume without affecting the mechanical strength of the pressure wall 16 and the suction wall 17 delimiting this central chamber 27.

What is claimed is:

1. A blade for a high-pressure turbine of a turbine engine, comprising:
   an airfoil extending in a spanwise direction, terminating in an apex and comprising a suction wall and a pressure wall joined at an upstream side by a leading edge and joined at a downstream side by a trailing edge;
   an internal cooling circuit having only an upstream duct and a central chamber for cooling the blade by circulating air;
   a plurality of disturbers projecting from the pressure wall and extending into the central chamber;
   a plurality of pressure wall cooling holes formed in the pressure wall for cooling the trailing edge, the plurality of pressure wall cooling holes being arranged in separate first and second columns extending along the spanwise direction, the first and second columns being offset from one another in a direction perpendicular to the spanwise direction, and the second column being positioned closer to the trailing edge than the first column,
   the upstream duct and the central chamber being separately supplied with air,
   the upstream duct being dedicated to the cooling of the leading edge and the suction wall, and
   the central chamber being dedicated to the cooling of the pressure wall and the trailing edge and being provided with bridge elements each connecting the suction wall and the pressure wall,
   wherein each pressure wall cooling hole of the plurality of pressure wall cooling holes intersects an external face of the pressure wall by forming an ellipse having an orientation inclined towards the trailing edge and relative to a rotation axis, wherein each pressure wall cooling hole is inclined such that an outlet thereof is offset from an inlet thereof towards the apex and towards the trailing edge, wherein the respective ellipses of the plurality of pressure wall cooling holes arranged in the first column have a greater angle of inclination with respect to the rotation axis than the respective ellipses of the plurality of pressure wall cooling holes arranged in the second column, wherein the plurality of disturbers extend parallel to the rotation axis, wherein the upstream duct and the central chamber are supplied by two inlets, respectively, located on a lower face of the root, wherein for a section of the airfoil perpendicular to the spanwise direction at the lower face, an area of the inlet of the upstream duct is equal to an area of the inlet of the central chamber, and wherein for any section of the airfoil perpendicular to the spanwise direction and beyond respective inlets of the upstream duct and the central chamber, a cross-sectional area of the upstream duct is less than or equal to one quarter of a corresponding cross-sectional area of the central chamber.

2. The blade according to claim 1, wherein the root is prolonged by a platform supporting the airfoil, wherein the upstream duct narrows from its inlet to the platform, and wherein the central chamber widens from its inlet to the platform.

3. The blade according to claim 1, each pressure wall cooling hole having a circular section and connecting the central chamber with an exterior of the blade by passing through the pressure wall, each pressure wall cooling hole extending from the respective inlet on an internal face of the pressure wall to the respective outlet on the external face of the pressure wall.

4. The blade according to claim 3, wherein the respective angles of inclination of the pressure wall cooling holes arranged in the first column are oriented such that, the closer to the apex the pressure wall cooling hole is, the larger said angle of inclination is, and wherein the respective angles of inclination of the pressure wall cooling holes arranged in the second column are oriented such that, the closer to the apex the pressure wall cooling hole is, the larger said angle of inclination is.

5. The blade according to claim 1, wherein the leading edge comprises a series of leading edge cooling holes each of which connects the upstream duct with an exterior of the blade, each leading edge cooling hole being inclined and comprising an outlet located on an external face of the leading edge, an inlet located on an internal face of the leading edge, each outlet of the respective leading edge cooling hole being closer to the apex than the respective inlet.

6. The blade according to claim 5, wherein each leading edge cooling hole is inclined by an angle, the closer to the apex each leading edge cooling hole is, the larger said angle is.

7. The blade according to claim 1, wherein the suction wall comprises a series of suction wall cooling holes for cooling the suction wall, each suction wall cooling hole having a section that increases from an inlet located on an inner face of the suction wall to an outlet located on an outer face of the suction wall.

8. The blade according to claim 7, wherein each suction wall cooling hole has an average section, the further from the apex the suction wall cooling hole is, the larger said average section is.

9. The blade according to claim 1, further comprising a plurality of ribs protruding from the pressure wall and extending into the upstream duct, wherein each rib of the plurality of ribs is inclined towards the leading edge and relative to the rotation axis.

10. The blade according to claim 1, further comprising:
a first dust removal hole connecting the upstream duct to an exterior of the blade at the apex;
a second dust removal hole connecting the central chamber to the exterior of the blade at the apex; and
a third dust removal hole connecting the central chamber to the exterior of the blade at the apex,
wherein the second dust removal hole is interposed between the first and third dust removal holes, and wherein the second dust removal hole has a diameter less than respective diameters of the first and third dust removal holes.

11. A turbine comprising a blade according to claim 1.

12. A helicopter comprising a turbine according to claim 11.

* * * * *